(12) United States Patent
Pan et al.

(10) Patent No.: US 10,177,555 B2
(45) Date of Patent: Jan. 8, 2019

(54) REVERSE GROUNDING PROTECTION CIRCUIT AND GROUND FAULT CIRCUIT INTERRUPTER

(71) Applicant: Ze Chen, Yueqing, Zhejiang Province (CN)

(72) Inventors: Xincheng Pan, Huizhou (CN); Ze Chen, Yueqing (CN)

(73) Assignee: Ze Chen, Yueqing (CN)

( * ) Notice: Subject to any disclaimer, the term of this patent is extended or adjusted under 35 U.S.C. 154(b) by 587 days.

(21) Appl. No.: 14/875,721

(22) Filed: Oct. 6, 2015

(65) Prior Publication Data

US 2016/0172839 A1      Jun. 16, 2016

(30) Foreign Application Priority Data

Dec. 15, 2014   (CN) .................... 2014 2 0795658 U

(51) Int. Cl.
| | |
|---|---|
| *H02H 3/00* | (2006.01) |
| *H02H 9/08* | (2006.01) |
| *H02H 3/16* | (2006.01) |
| *H02H 3/33* | (2006.01) |

(52) U.S. Cl.
CPC ................. *H02H 3/16* (2013.01); *H02H 3/33* (2013.01)

(58) Field of Classification Search
CPC ...................................................... H02H 3/16
USPC ......................................................... 361/42
See application file for complete search history.

(56) References Cited

U.S. PATENT DOCUMENTS

| | | | |
|---|---|---|---|
| 4,001,652 A | 1/1977 | Klein | |
| 4,901,183 A * | 2/1990 | Lee ........................ | H02H 9/042 361/111 |
| 5,541,800 A | 7/1996 | Misencik | |
| 6,828,886 B2 | 12/2004 | Germain | |
| 6,954,125 B2 | 10/2005 | Wu | |
| 7,408,432 B2 * | 8/2008 | Shi ......................... | H01H 83/04 335/17 |
| 7,889,466 B2 | 2/2011 | Chan | |
| 7,936,238 B1 | 5/2011 | Weeks | |
| 8,335,062 B2 | 12/2012 | Haines | |
| 8,462,006 B2 | 6/2013 | Chen | |
| 8,779,875 B2 | 7/2014 | Chen | |
| 8,847,712 B2 | 9/2014 | Chen | |
| 8,861,146 B2 * | 10/2014 | McMahon ............. | H01H 47/22 361/42 |
| 2004/0070474 A1 | 4/2004 | Wu | |

(Continued)

*Primary Examiner* — Thienvu Tran
*Assistant Examiner* — Lucy Thomas
(74) *Attorney, Agent, or Firm* — Mei & Mark LLP

(57) ABSTRACT

The present disclosure relates to a reverse grounding protection circuit and a ground fault circuit interrupter. The reverse grounding protection circuit may include a power supply circuit, a leakage signal amplifying circuit, a leakage grounding detection circuit, a power supply indicator circuit, a manual detection circuit, a tripping mechanism control circuit, a reverse connection detection and execution circuit, and a power-on driving signal generating circuit. A ground fault circuit interrupter may comprise an interrupter body and a reverse grounding protection circuit in the interrupter body. The practice of the present disclosure may avoid the risk from reverse connection of the ground fault circuit interrupter and output of power of reverse connection, and thus improve safety of the ground fault circuit interrupter.

12 Claims, 3 Drawing Sheets

(56) References Cited

U.S. PATENT DOCUMENTS

| | | |
|---|---|---|
| 2005/0063109 A1 | 3/2005 | Baldwin |
| 2007/0030608 A1 | 2/2007 | Baldwin |
| 2007/0279814 A1 | 12/2007 | Bonilla |
| 2008/0002314 A1 | 1/2008 | Batko |
| 2010/0254049 A1 | 10/2010 | Yue |
| 2010/0259347 A1 | 10/2010 | Ziegler |
| 2014/0285939 A1 | 9/2014 | Chen |

* cited by examiner

US 10,177,555 B2

REVERSE GROUNDING PROTECTION CIRCUIT AND GROUND FAULT CIRCUIT INTERRUPTER

CROSS-REFERENCE TO RELATED APPLICATION

This application claims priority to and incorporates herein Chinese application No. 201420795658.1 filed on Dec. 15, 2014.

TECHNICAL FIELD

The present disclosure relates to a reverse grounding protection circuit, and also relates to a ground fault circuit interrupter using the reverse grounding protection circuit.

BACKGROUND

The ground fault circuit interrupter (GFCI) is a leakage protection product widely used in countries/regions such as the United States, Canada, North America, and South America. It plays an important role in protecting safety of lives and property of the people in the aforementioned areas. An existing GFCI generally comprises a base, a cover with receptacle jacks, an electromagnetic tripping mechanism, a contact assembly, a grounding assembly, a power input connection assembly, a power output connection assembly, and other components. Its circuits include a power supply circuit, a leakage grounding detection circuit, a signal amplifying circuit, a power supply indicator circuit, a manual detection circuit, a reverse connection detection and execution circuit, and a tripping mechanism driving circuit. The electromagnetic tripping mechanism is controlled by the leakage grounding detection circuit. The GFCI can supply power to the load through the receptacle jacks in the cover, and can also provide power to the load connected thereof through the power output connection assembly. US patent application publications with the numbers US2013021120A1 and US2013038968A1 disclose the above conventional GFCI.

Due to existing restrictions on circuit design, the conventional GFCI suffers the following security risks: if the power lines are reversely connected due to the mistake of the installer during installation and use of a GFCI, the GFCI fails to function for leakage protection in the reset state and imposes a safety risk arising from the reverse connection because it is difficult to notice the reverse connection when the power is off.

SUMMARY

A first object of the present disclosure is to provide a reverse grounding protection circuit to deal with the safety risk existing in the conventional ground fault circuit interrupter arising from reverse connection, and thereby improve the safety characteristics of the ground fault circuit interrupter. A second object of the present disclosure is to provide a ground fault circuit interrupter to deal with the safety risk existing in the conventional ground fault circuit interrupter arising from reverse connection.

In one example, a reverse grounding protection circuit includes a power supply circuit, a leakage signal amplifying circuit, a leakage grounding detection circuit, a power supply indicator circuit, a manual detection circuit, a tripping mechanism control circuit, a reverse connection detection and execution circuit, and a power-on driving signal generating circuit.

In a another example of the reverse grounding protection circuit, the leakage signal amplifying circuit carries out amplification of a leakage detection signal; the power supply indicator circuit carries out displaying of a power status; the manual detection circuit carries out a simulation of load leakage detection; the tripping mechanism control circuit carries out controlling of the reset switch; the reverse connection detection and execution circuit carries out reverse connection detection and on/off control when the reverse grounding protection circuit is in a reset state or a tripping state; and the power-on driving signal generating circuit is configured such what when power is turned on, the power-on driving signal generating circuit generates a driving signal for the reverse connection detection and execution circuit.

In yet another example of the reverse grounding protection circuit, the power supply circuit comprises a power supply filter circuit, a rectifier circuit, a first filter and regulator circuit, and a second filter and regulator circuit; the leakage grounding detection circuit comprises a leakage detection circuit and a grounding detection circuit, which detect leakage fault and grounding fault, respectively; and the tripping mechanism control circuit comprises a reset switch provided on a live line and a neutral line of the reverse grounding protection circuit.

In yet another example of the reverse grounding protection circuit, the power supply filter circuit is connected to the live line at an input port; input terminals of the rectifier circuit are connected to the live line at the input port and an output terminal of the power supply filter circuit, respectively; a first output terminal pin of the rectifier circuit is grounded; a second output terminal pin of the rectifier circuit is connected to the first filter and regulator circuit and the second filter and regulator circuit; the first filter and regulator circuit of the power supply circuit is connected to the leakage signal amplifying circuit; the second filter and regulator circuit of the power supply circuit is connected to the power supply indicator circuit and supplies power to the reverse connection detection circuit and execution circuit; the leakage signal amplifying circuit is connected to the leakage grounding detection circuit and the tripping mechanism control circuit, respectively; the reset switch provided is located on the live line and the neutral line after the grounding detection circuit; the manual detection circuit is connected to the leakage grounding detection circuit; the second filter and regulator circuit of the power supply circuit is connected to the power-on driving signal generating circuit; and the power-on driving signal generating circuit is connected to the reverse connection detection and execution circuit.

In yet another example of the reverse grounding protection circuit, the power supply filter circuit further comprises an inductor coil. The first filter and regulator circuit comprises a first current limiting resistor, a first filter capacitor, and an internal regulator circuit of a leakage signal processing IC at a first pin; the first current limiting resistor is connected between the second output terminal pin of the rectifier circuit and the first pin of the leakage signal processing IC; and the first filter capacitor is connected between the first pin of the leakage signal processing IC and a ground. The second filter and regulator circuit comprises a second current limiting resistor, a stabilivolt, and a second filter capacitor; an input terminal of the second current limiting resistor is connected to the second output terminal pin of the rectifier circuit; an output terminal of the second current limiting resistor is connected to the power supply indicator circuit and the reverse connection detection and execution circuit; a positive terminal of the stabilivolt is grounded; a negative terminal of the stabilivolt is connected to an output terminal of the second current limiting resistor; a first terminal of the second filter capacitor is grounded; and a second terminal of the second filter capacitor is connected to an output terminal of the second current limiting resistor. The leakage detecting circuit of the leakage grounding detection circuit comprises a current first coupling induction coil and a third capacitor; the third capacitor is connected to two ends of the first current coupling induction coil to form a first filter circuit; the first filter circuit is connected to a first and a second pin of the leakage signal processing IC; the live and neutral lines pass through the first current coupling induction coil; the leakage grounding detection circuit comprises a second current coupling induction coil and a fourth capacitor; the fourth capacitor is connected to two ends of the second current coupling induction coil to form a second filter circuit; a first terminal of the second filter circuit is grounded and a second terminal of the second filter circuit is connected to a fourth pin of the leakage signal processing IC; and the live and neutral lines pass through the second current coupling induction coil. The leakage signal amplifying circuit comprises the leakage signal processing IC, a first coupling capacitor, a negative feedback resistor, and a second coupling capacitor; the first coupling capacitor, the negative feedback coupling resistor, and the second capacitor are sequentially connected in series between the first current coupling induction coil and the second current coupling induction coil; and the negative feedback resistor in connected between a fifth pin and the fourth pin of the leakage signal processing IC.

In yet another example of the reverse grounding protection circuit, the power supply indicator circuit comprises a third current limiting resistor and an LED indicator; the third current limiting resistor and the LED are connected in series, with the third current limiting resistor connected to the output terminal of the second current limiting resistor and the LED being grounded. The manual detection circuit comprises a fourth current limiting resistor and a first press switch; the first fourth limiting resistor and the first press switch are connected in series, with a terminal of the fourth current limiting resistor connected to an input terminal of the neutral line and the first press switch connected to the live line at an output jack terminal. The control circuit of the tripping mechanism control circuit comprises a the leakage signal processing IC, a fifth filter capacitor, a sixth filter capacitor, a fifth current limiting resistor, a one-way silicon controlled rectifier, a seventh filter capacitor, a surge absorption resistor, and a relay that interfaces with the inductor coil; the fifth filter capacitor and the sixth filter capacitor are connected in parallel, between a sixth pin of the leakage signal processing IC and the ground; the fifth current limiting resistor connected between the sixth pin of the leakage signal processing IC and a control electrode of the one-way silicon controlled rectifier; an anode of the one-way silicon controlled rectifier is connected to a connection point where the inductor coil is connected to an AC input connection point of the rectifier circuit; a cathode of the one-way silicon controlled rectifier is grounded; and the seventh filter capacitor and the surge absorption resistor are connected in series between the anode of the one-way silicon controlled rectifier and the ground. The relay drives the reset switch through a mechanical link.

In yet another example of the reverse grounding protection circuit, the power-on driving signal generating circuit comprises a sixth current limiting resistor, a first divider resistor, a second divider resistor, a delay capacitor, and a FET; the sixth current limiting resistor is connected between the output terminal of the second current limiting resistor and a source electrode of the FET; the first and second divider resistors are connected in series, between an AC input connection point of the rectifier circuit of the power supply circuit and the ground; each of the first and second divider resistors is connected to a gate electrode of the first FET; the delay capacitor and the second divider resistor are connected in parallel; and a drain electrode of the FET is an output terminal of the power-on driving signal generating circuit. The reverse connection detection and execution circuit comprises a heavy and light current isolation optocoupler, a triggering current limiting resistor, a false triggering preventing resistor, two-way silicon controlled rectifier, an eighth filter capacitor, a ninth filter capacitor, a normally-closed contact, a normally-open contact, a seventh resistor, a normally-closed switch, and a reverse relay; a first pin of a power terminal of the optocoupler is connected to the drain electrode of the FET, and a second pin of a power terminal of the optocoupler is grounded; the triggering current limiting resistor is connected between a first output terminal of the optocoupler and an output terminal of the live line; the false triggering preventing resistor is connected between a control electrode of the two-way silicon controlled rectifier and a first T2 electrode of the two-way silicon controlled rectifier; the control electrode of the two-way silicon controlled rectifier is connected to a second output terminal of the optocoupler; a second T2 electrode of the two-way silicon controlled rectifier is connected to the output terminal of the live line; the eighth filter capacitor and the ninth filter capacitor are connected in series between the first T2 electrode of the two-way silicon controlled rectifier and the output terminal of the live line, in parallel with the normally-closed contact, and in parallel with the normally-open contact; the eighth filter capacitor is connected to the first T2 electrode of the two-way silicon controlled rectifier; the seventh resistor is connected between a point where the eighth filter capacitor is connected to the ninth filter capacitor, and an output terminal of the neutral line; the normally-closed switch is provided on both the live line and neutral line, and located between the output terminal of the live line and the reset switch, and between the output terminal of the neutral line and the reset switch; the normally-closed switch is linked with the second normally-open contact; a first control terminal of the reverse relay is connected to the first T2 electrode of the two-way silicon controlled rectifier and a second control terminal of the reverse relay is connected to the output terminal of the neutral line; and the reverse relay drives the normally-closed switch through a second mechanical link.

In yet other examples of the reverse grounding protection circuit, the power supply circuit comprises a piezoresistor and a over-current protection resistor; the piezoresistor is connected between live line at the input port and the neutral line at the input port; and the over-current protection resistor is connected between the live line at the input port and the input terminal of the filter circuit of the power supply circuit.

In another example, a ground fault circuit interrupter includes an interrupter body that includes any of the reverse grounding protection circuits described above.

Compared with the prior art, a reverse grounding protection circuit, also relates to the use of the ground fault circuit interrupter with the following beneficial effects: First, a power-on driving signal generating circuit is added to the reverse grounding protection circuit such that, in the reset state, each time the power is turned on, a high voltage driving pulse signal of approximate 10 ms is generated by the power-on driving signal generating circuit. The signal triggers the reverse connection detection and execution circuit to work. When the ground fault circuit interrupter is connected reversely, the reverse connection detection and execution circuit is triggered to work by the pulse signal, thereby assuring that the ground fault circuit interrupter is powered off and reminding the user of the reverse connection of the ground fault circuit interrupter and the need of correction. In this way, a reverse grounding protection circuit is able to avoid the risk from reverse connection of the ground fault circuit interrupter and output of power of reverse connection, and thus improve safety of the ground fault circuit interrupter. Second, the circuit is simple and easy to implement.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the embodiments of the present disclosure and together with the description, serve to explain the principles of the invention.

DETAILED DESCRIPTION

References will now be made in detail to the present exemplary embodiments, examples of which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Figure 1:
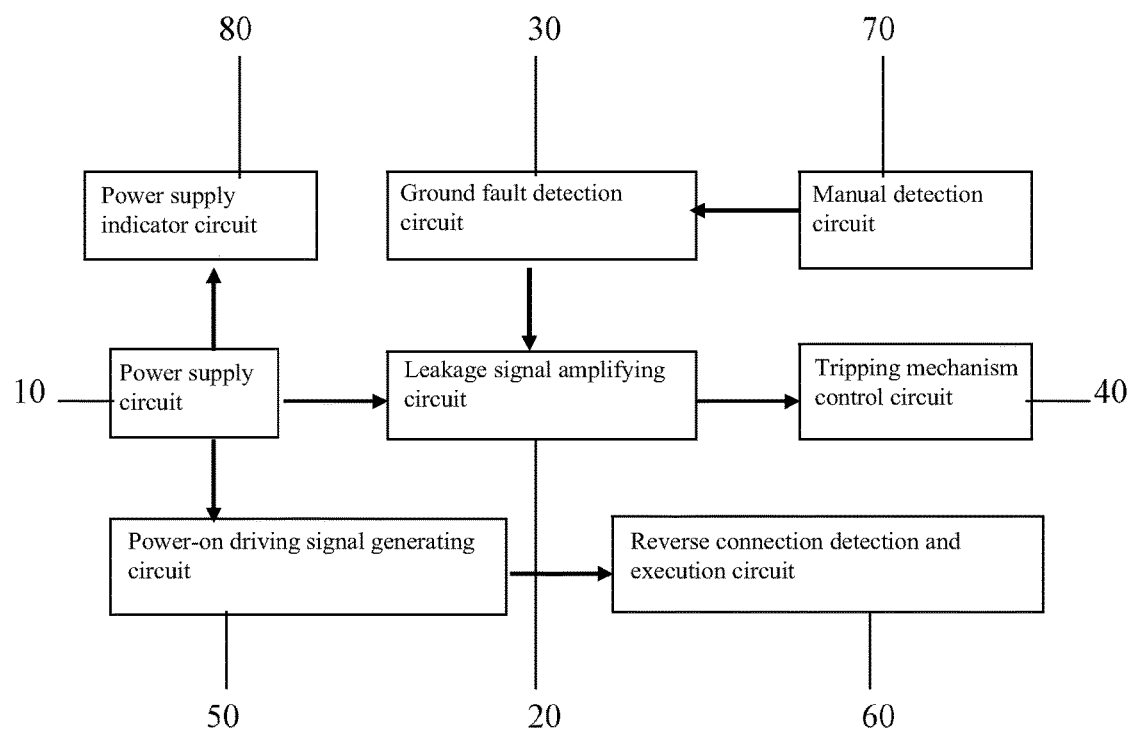
FIG. 1 is a block diagram of an embodiment of the reverse grounding protection circuit of the present disclosure.
Figure 2:
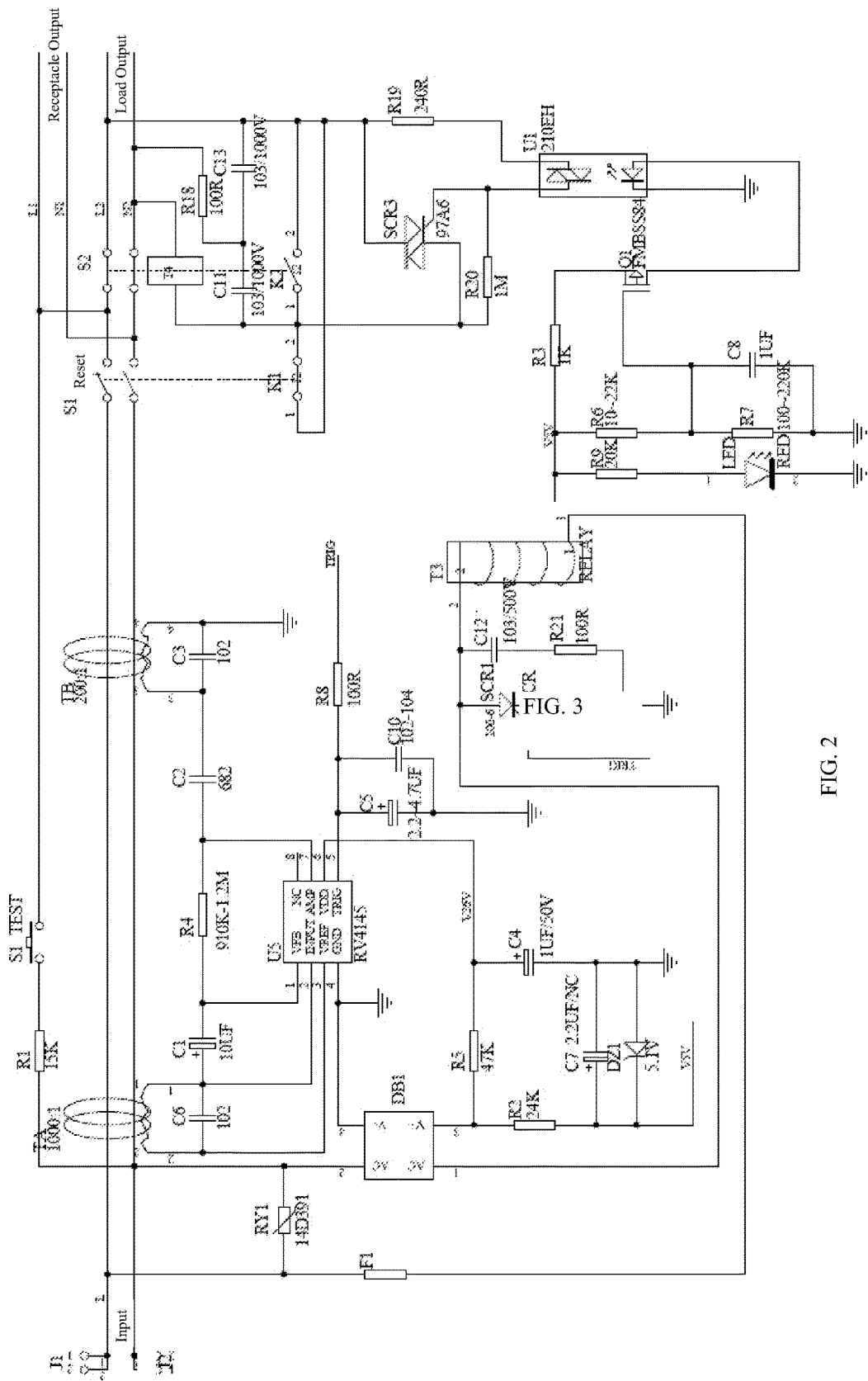
FIG. 2 is a circuit diagram of an embodiment of the reverse grounding protection circuit of the present disclosure.

As shown in FIGS. 1 and 2, a reverse grounding protection circuit according to the present disclosure model comprises: a power supply circuit 10, a leakage signal amplifying circuit 20, a leakage grounding detection circuit 30, a power supply indicator circuit 80, a manual detection circuit 70, a tripping mechanism control circuit 40, an power-on driving signal generating circuit 50, and a reverse connection detection and execution circuit 60.

The power supply circuit 10 comprises: a filter circuit, a rectifier circuit DB1, a first filter and regulator circuit, and a second filter and regulator circuit. The filter circuit is connected to the live line of the input port of municipal electricity. The input terminals of the rectifier circuit DB1 are respectively connected to the live line of the input port of municipal electricity and an output terminal of the filter circuit. The output terminal pin 4 of the rectifier circuit DB1 is grounded, and the output terminal pin 3 is connected to the first filter and regulator circuit and the second filter and regulator circuit, respectively.

The first filter and regulator circuit of the power supply circuit 10 is connected to the leakage signal amplifying circuit 20. The second filter and regulator circuit of the power supply circuit 10 is connected to the power supply indicator circuit 80 and the power-on driving signal generating circuit 50. The output terminals of the power-on driving signal generating circuit 50 are connected to the reverse connection detection and execution circuit 60.

At the time the power is turned on, the power-on driving signal generating circuit 50 generates a driving signal for the reverse connection detection and execution circuit 60. The power supply circuit 10 supplies power to the reverse connection detection and execution circuit 60 via the power-on driving signal generating circuit 50.

The leakage signal amplifying circuit 20 is connected to the leakage grounding detection circuit 30 and the tripping mechanism control circuit 40, respectively. The manual detection circuit 70 is connected to the leakage grounding detection circuit 30.

The leakage signal amplifying circuit 20 carries out amplification of the leakage detection signal.

The leakage grounding detection circuit 30 comprises a leakage detection circuit and a grounding detection circuit, which detect leakage fault and grounding fault, respectively.

The power supply indicator circuit 80 carries out displaying of the power status.

The manual detection circuit 70 carries out simulation of load leakage detection.

The tripping mechanism control circuit 40 comprises: a reset switch S1 provided on the live line L and the neutral line N of the reverse grounding protection circuit and its control circuit. The position where the reset switch S1 is provided on the live line L and the neutral line N of the reverse grounding protection circuit is located after the grounding detection circuit of the leakage grounding detection circuit 30. The tripping mechanism control circuit 40 carries out controlling of the reset switch S1.

The reverse connection detection and execution circuit 60 carries out reverse connection detection and on/off controlling of the circuit when the reverse grounding protection circuit is in a reset state or a tripping state.

As shown in FIG. 2, in this embodiment, the filter circuit of the power supply circuit 10 comprises an inductor T3. The first filter and regulator circuit comprises a current limiting resistor R5, a filter capacitor C4, and an internal regulator circuit of pin 6 of a leakage signal processing IC U5. The rectifier circuit adopts a full bridge rectifier circuit DB1; in other embodiments, a rectifier circuit such as a half-wave rectifier circuit can be used for the purpose of the present disclosure. Two ends of the current limiting resistor R5 are respectively connected to an output terminal pin 3 of the rectifier circuit DB1 and pin 6 of the leakage signal processing IC U5. The filter capacitor C4 is connected between pin 6 of the leakage signal processing IC U5 and the ground. The second filter and regulator circuit comprises a current limiting resistor R2, a stabilivolt DZ1, and a filter capacitor C7. The input terminal of the current limiting resistor R2 is connected to pin 3 of the rectifier circuit DZ1, the output terminal V5V of the current limiting resistor R2 is connected to the power supply indicator circuit 80 and the reverse connection detection and execution circuit 60. The positive terminal of the stabilivolt DZ1 is grounded, and its negative terminal is connected to an output terminal of the current limiting resistor R2. One terminal of the filter capacitor C7 is grounded, and the other terminal is connected to an output terminal of the current limiting resistor R2.

As shown in FIG. 2, in the present embodiment, the leakage detecting circuit of the leakage grounding detection circuit 30 comprises a current coupling induction coil TA and a capacitor C6. The capacitor C6 is connected to two ends of the current coupling induction coil TA to form a filter circuit. The filter circuit is connected to pin 2 and pin 3 of the leakage signal processing IC U5 of the leakage signal amplifying circuit 20. The municipal electricity supply lines pass through the current coupling induction coil TA.

The leakage grounding detection circuit 30 comprises a current coupling induction coil TB and a capacitor C3. The capacitor C3 is connected to two ends of the current coupling induction coil TB to form a filter circuit. One terminal of the filter circuit is grounded, and the other terminal is connected to pin 7 of the leakage signal processing IC U5 of the leakage signal amplifying circuit 20. The municipal electricity supply lines pass through the current coupling induction coil TB.

As shown in FIG. 2, in the present embodiment, the leakage signal amplifying circuit 20 comprises a leakage signal processing IC U5, a coupling capacitor C1, a negative feedback resistor R4, and a coupling capacitor C2. The coupling capacitor C1, the negative feedback coupling resistor R4, and the capacitor C2 are sequentially connected in series between the current coupling induction coil TA and the current coupling induction coil TB. Two ends of the negative feedback resistor R4 are connected to pin 1 and pin 7 of the leakage signal processing IC U5.

As shown in FIG. 2, in this embodiment, the power supply indicator circuit 80 comprises a current limiting resistor R9 and a light emitting diode (LED) indicator. The current limiting resistor R9 and the Light-emitting diode LED indicator are connected in series; one terminal is connected to an output terminal of the current limiting resistor R2 of the power supply circuit 10, and the other terminal is grounded. The positive terminal of the light emitting diode LED is connected to high electrical potential, and the negative terminal is connected to low electrical potential.

As shown in FIG. 2, in this embodiment, the manual detection circuit 70 comprises a current limiting resistor R1 and a press switch S1 (labeled S1 Test). The current limiting resistor R1 and the press switch S1 are connected in series; and then, one terminal of the current limiting resistor R1 is connected to the input terminal of the neutral line N of the reverse grounding protection circuit, one terminal of the press switch S1 is connected to the output jack terminal L1 of the live line L of the reverse grounding protection circuit.

As shown in FIG. 2, in the present embodiment, the control circuit of the tripping mechanism control circuit 40 comprises a leakage signal processing IC U5, a filter capacitor C5, a filter capacitor C10, a current limiting resistor R8, a one-way silicon controlled rectifier SCR1, a filter capacitor C12, a surge absorption resistor R21, and a relay T3. Relay T3 may interface with inductor T3. The filter capacitor C5 and the filter capacitor C10 are connected in parallel, with one terminal connected to pin 5 of the leakage signal processing IC U5 and the other terminal grounded. One terminal of the current limiting resistor R8 is connected to pin 5 of the leakage signal processing IC U5, and the other terminal is connected to the control electrode of the one-way silicon controlled rectifier SCR1. The anode of the one-way silicon controlled rectifier SCR1 is connected to the connection point where the coil of the relay T3 is connected to the AC input connection point of the rectifier circuit, the cathode of the one-way silicon controlled rectifier SCR1 is grounded. The filter capacitor C12 and the surge absorption resistor R21 are connected in series between the anode of the one-way silicon controlled rectifier SCR1 and the ground. The relay T3 drives the reset switch S1 through a mechanical link.

C12 and R21 have the function of surge absorption, so as to prevent damage on SCR1 and related circuitry by the surge voltage generated when the relay T3 is turned off after being switched on, assuring normal working of the circuit. In a normal state, S1 (reset) is switched on (i.e., closed), ensuring that the load circuit is provided with power supply. In an abnormal state, SCR1 is switched on, the relay T3 is engaged, which turns off (i.e., opens) the switch S1 (reset) through a mechanical link and thus disconnects power supply.

As shown in FIG. 2, in the present embodiment, the power-on driving signal generating circuit 50 comprises a current limiting resistor R3, a divider resistor R6, a divider resistor R7, a delay capacitor C8, and a FET Q1. One terminal of the current limiting resistor R3 is connected to the output terminal V5V of the current limiting resistor R2 of the rectifier circuit of the power supply circuit 10, the other terminal is connected to the source electrode of the FET Q1. The divider resistors R6 and R7 are connected in series. One terminal of the divider resistor R6 is connected to an AC input connection point of the rectifier circuit of the power supply circuit. One terminal of the divider resistor R7 is grounded. The connection point of the divider resistors R6 and R7 is connected to the gate electrode of the FET Q1. The delay capacitor C8 and the divider resistor R7 are connected in parallel. The drain electrode of the FET Q1 is an output terminal of the power-on driving signal generating circuit 50.

As shown in FIG. 2, in the present embodiment, the reverse connection detection and execution circuit 60 comprises a heavy and light current isolation optocoupler U1, a triggering current limiting resistor R19, a false triggering preventing resistor R20, a two-way silicon controlled rectifier SCR3, a filter capacitor C11, a filter capacitor C13, a normally-closed contact K1, a normally-open contact K2, a resistor R18, a normally-closed switch S2, and a reverse relay T4. In this disclosure, the terms normally-open and normally-closed refer to the initial state of element in the GFCI, for example the state of a new GFCI prior to installation. Pin PIN2 of the power terminal of the heavy and low current isolation optocoupler U1 is connected to the drain electrode of FET Q1 of the power-on driving signal generating circuit 50, and pin PIN1 is grounded. One terminal of the trigger current limiting resistor R19 is connected to a first output terminal of the heavy and low current isolation optocoupler U1, and the other terminal is connected to the output terminal L2 of the live line of the municipal electricity of the reverse grounding protection circuit. The false triggering preventing resistor R20 is connected between the control electrode and a first T2 electrode of the two-way silicon controlled rectifier SCR3. The control electrode of the two-way silicon controlled rectifier SCR3 is connected to a second output terminal of the heavy and low current isolation optocoupler U1. A second T2 electrode is connected to the output terminal L2 of the live line of the municipal electricity of the reverse grounding protection circuit. The filter capacitors C11 and the filter capacitor C13 are connected in series. Filter capacitor C11 is connected with both the normally-closed contact K1 and normally-open contact K2 at the first T2 electrode of the two-way silicon controlled rectifier SCR3. Filter capacitor C13 is connected with both the normally-closed contact K1 and normally-open contact K2 at the output terminal L2 of the live line of the municipal electricity of the reverse grounding protection circuit. One terminal of the resistor R18 is connected to the point where the filter capacitor C11 is connected to the filter capacitor C13, and its other terminal is connected to the output terminal N2 of the neutral line of the municipal electricity of the reverse grounding protection circuit. The normally-closed switch S2 is provided on the live line L and neutral line N of the municipal electricity power supply of the reverse grounding protection circuit, and is located between the live line output terminal L2 of the municipal electricity, the neutral line output terminal N2 of the municipal electricity, and the reset switch S1. The normally-closed switch S2 is linked with the normally-open contact K2. One terminal of the control terminals of the reverse relay T4 is connected to the first T2 electrode of the two-way silicon controlled rectifier SCR3; the other terminal is connected to the output terminal N2 of the neutral line of the municipal electricity of the reverse grounding protection circuit. The relay T4 drives the normally-closed switch S2 through a mechanical link.

As shown in FIG. 2, in the present embodiment, the power supply circuit 10 is further provided with a piezoresistor RY1 and an over-current protection resistor F1. The piezoresistor RY1 is connected between the input terminal of the live line L and the input terminal of the neutral line N of the municipal electricity of the reverse grounding protection circuit. The over-current protection resistor F1 is connected between the input terminal of the live line L of the municipal electricity of the reverse grounding protection circuit and the input terminal of the filter circuit of the power supply circuit 10.

In other embodiments, the power supply circuit 10 is not provided with the piezoresistor RY1 or the over-current protection resistor F1, which does not affect realizing the purposes of the present disclosure.

Figure 3:
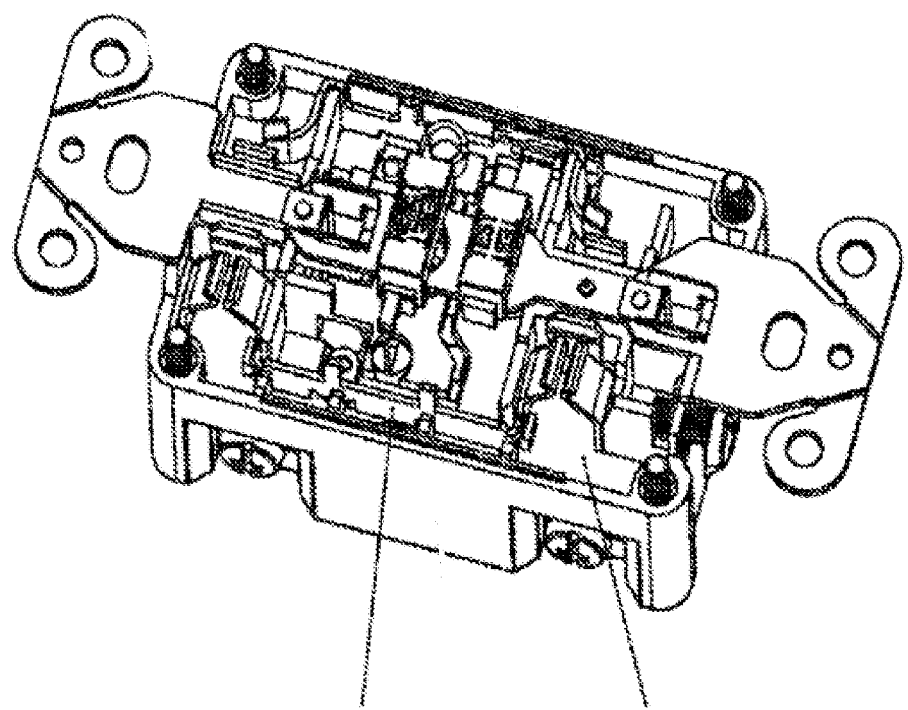
FIG. 3 is a perspective view of an embodiment of the grounding fault interrupter of the present disclosure.

As shown in FIG. 3, the ground fault circuit interrupter 100 (GFCI) of the present disclosure comprises an interrupter body 101. A reverse grounding protection circuit in the interrupter body 101 adopts the reverse grounding protection circuit of the present disclosure as described above (the description of which is omitted here).

The automatic reverse connection interruption of the ground fault circuit interrupter 100 (GFCI) of the present disclosure works as follows:

First, the GFCI 100 has a tripping state where S1 (reset) is open: When the GFCI is in the tripping state, K1 is closed and power is supplied to T4 through the path where K1 is located. In this state, if a user mistakenly made a reverse connection of the ground fault circuit interrupter 100, T4 will be pulled in, opening S2 and disconnecting the electrical connection between the load output terminals and both the receptacle jacks and input terminals. Also, once T4 is pulled in, the switch K2 is closed and, together with K1, continuously provides power to T4 such that the reverse protection mechanism can maintain the pulled-in state. Even if the user presses the reset button to reopen K1, T4 still maintains the pulled-in state because the switch K2 remains closed to supply power to T4, making the load output terminals of the product always electrically disconnected from the receptacle jacks and input terminals, and reminding the user of the reverse connection and the need to correction it.

Second, the GFCI 100 has a reset state where S1 (reset) is closed: In the reset state, each time the power is turned on, a high potential driving pulse signal of approximately 10 ms is generated by the power-on driving signal generating circuit 50, which drives the LED in the optoelectronic chip U1 to emit light and connects pins PIN3 and PIN4 of the optoelectronic chip. After passing through the current limiting resistor R19, the power from L2 triggers the two-way silicon controlled rectifier SCR3 into a conductive state via pins PIN3 and PIN4 of the chip U1, and thus supplies power to T4. In this reset state, there are two conditions: If (A) the user has made a reverse connection, L2/N2 is electrified, as T4 is powered by SCR3 that is in a conductive state. T4 is pulled in and its normally-closed switch S2 is opened, powering off the socket. At the same time, the normally-open contact K2 is closed, permitting T4 to be powered via K2. Thus, as long as the user does not disconnect and correctly rewire the GFCI, T4 will always be energized and S2 will always be open, assuring that that no power is in the socket.

If (B) the user has made a correct connection, when SCR3 is connected through, T4 is electrified and pulled in, and normally-closed contact S2 is opened. L2/N2 is partly dis-electrified and thus T4 is dis-electrified. The reverse relay will immediately bounce back under the force of its spring, the open contact S2 will be closed again, assuring properly electricity for the user.

In the preceding specification, various preferred embodiments have been described with reference to the accompanying drawings. It will, however, be evident that various other modifications and changes may be made thereto, and additional embodiments may also be implemented, without departing from the broader scope of the invention as set forth in the claims that follow.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A reverse grounding protection circuit, comprising:
a power supply circuit;
a leakage signal amplifying circuit;
a leakage grounding detection circuit;
a power supply indicator circuit;
a manual detection circuit;
a tripping mechanism control circuit;
a reverse connection detection and execution circuit; and
a power-on driving signal generating circuit,
wherein:
the leakage signal amplifying circuit carries out amplification of a leakage detection signal;
the power supply indicator circuit carries out displaying of a power status;
the manual detection circuit carries out a simulation of load leakage detection;
the tripping mechanism control circuit carries out controlling of the reset switch;
the reverse connection detection and execution circuit carries out reverse connection detection and on/off control when the reverse grounding protection circuit is in a reset state or a tripping state;
the power-on driving signal generating circuit is configured such that, when power is turned on, the power-on driving signal generating circuit generates a driving signal for the reverse connection detection and execution circuit;
the power supply circuit comprises a power supply filter circuit, a rectifier circuit, a first filter and regulator circuit, and a second filter and regulator circuit;

the leakage grounding detection circuit comprises a leakage detection circuit and a grounding detection circuit, which detect leakage fault and grounding fault, respectively;

the tripping mechanism control circuit comprises a reset switch provided on a live line and a neutral line of the reverse grounding protection circuit, which is located on the live line and the neutral line after the grounding detection circuit;

the power supply filter circuit is connected to the live line at an input port;

input terminals of the rectifier circuit are connected to the live line at the input port and an output terminal of the power supply filter circuit, respectively;

a first output terminal pin of the rectifier circuit is grounded;

a second output terminal pin of the rectifier circuit is connected to the first filter and regulator circuit and the second filter and regulator circuit;

the first filter and regulator circuit of the power supply circuit is connected to the leakage signal amplifying circuit;

the second filter and regulator circuit of the power supply circuit is connected to the power supply indicator circuit and supplies power to the reverse connection detection circuit and execution circuit;

the leakage signal amplifying circuit is connected to the leakage grounding detection circuit and the tripping mechanism control circuit, respectively;

the reset switch provided is located on the live line and the neutral line after the grounding detection circuit;

the manual detection circuit is connected to the leakage grounding detection circuit; the second filter and regulator circuit of the power supply circuit is connected to the power-on driving signal generating circuit;

the power-on driving signal generating circuit is connected to the reverse connection detection and execution circuit;

the power supply filter circuit further comprises an inductor coil;

the first filter and regulator circuit comprises a first current limiting resistor, a first filter capacitor, and an internal regulator circuit of a leakage signal processing IC at a first pin;

the first current limiting resistor is connected between the second output terminal pin of the rectifier circuit and the first pin of the leakage signal processing IC;

the first filter capacitor is connected between the first pin of the leakage signal processing IC and a ground;

the second filter and regulator circuit comprises a second current limiting resistor, a stabilivolt, and a second filter capacitor;

an input terminal of the second current limiting resistor is connected to the second output terminal pin of the rectifier circuit;

an output terminal of the second current limiting resistor is connected to the power supply indicator circuit and the reverse connection detection and execution circuit;

a positive terminal of the stabilivolt is grounded;

a negative terminal of the stabilivolt is connected to an output terminal of the second current limiting resistor;

a first terminal of the second filter capacitor is grounded, and a second terminal of the second filter capacitor is connected to an output terminal of the second current limiting resistor;

the leakage detecting circuit of the leakage grounding detection circuit comprises a current first coupling induction coil and a third capacitor;

the third capacitor is connected to two ends of the first current coupling induction coil to form a first filter circuit;

the first filter circuit is connected to a first and a second pin of the leakage signal processing IC;

the live and neutral lines pass through the first current coupling induction coil;

the leakage grounding detection circuit comprises a second current coupling induction coil and a fourth capacitor;

the fourth capacitor is connected to two ends of the second current coupling induction coil to form a second filter circuit;

a first terminal of the second filter circuit is grounded and a second terminal of the second filter circuit is connected to a fourth pin of the leakage signal processing IC;

the live and neutral lines pass through the second current coupling induction coil;

the leakage signal amplifying circuit comprises the leakage signal processing IC, a first coupling capacitor, a negative feedback resistor, and a second coupling capacitor;

the first coupling capacitor, the negative feedback coupling resistor, and the second capacitor are sequentially connected in series between the first current coupling induction coil and the second current coupling induction coil; and the negative feedback resistor in connected between a fifth pin and the fourth pin of the leakage signal processing IC.

2. The reverse grounding protection circuit according to claim 1, wherein, the power supply indicator circuit comprises a third current limiting resistor and an LED indicator;

the third current limiting resistor and the LED are connected in series, with the third current limiting resistor connected to the output terminal of the second current limiting resistor and the LED being grounded;

the manual detection circuit comprises a fourth current limiting resistor and a first press switch:

the first fourth limiting resistor and the first press switch are connected in series, with a terminal of the fourth current limiting resistor connected to an input terminal of the neutral line and the first press switch connected to the live line at an output jack terminal;

the control circuit of the tripping mechanism control circuit comprises a the leakage signal processing IC, a fifth filter capacitor, a sixth filter capacitor, a fifth current limiting resistor, a one-way silicon controlled rectifier, a seventh filter capacitor, a surge absorption resistor, and a relay that interfaces with the inductor coil;

the fifth filter capacitor and the sixth filter capacitor are connected in parallel, between a sixth pin of the leakage signal processing IC and the ground;

the fifth current limiting resistor connected between the sixth pin of the leakage signal processing IC and a control electrode of the one-way silicon controlled rectifier;

an anode of the one-way silicon controlled rectifier is connected to a connection point where the inductor coil is connected to an AC input connection point of the rectifier circuit;

a cathode of the one-way silicon controlled rectifier is grounded;

the seventh filter capacitor and the surge absorption resistor are connected in series between the anode of the one-way silicon controlled rectifier and the ground;

the relay drives the reset switch through a mechanical link.

3. The reverse grounding protection circuit according to claim 2, wherein:

the power-on driving signal generating circuit comprises a sixth current limiting resistor, a first divider resistor, a second divider resistor, a delay capacitor, and a FET;

the sixth current limiting resistor is connected between the output terminal of the second current limiting resistor and a source electrode of the FET;

the first and second divider resistors are connected in series, between an AC input connection point of the rectifier circuit of the power supply circuit and the ground;

each of the first and second divider resistors is connected to a gate electrode of the first FET;

the delay capacitor and the second divider resistor are connected in parallel;

a drain electrode of the FET is an output terminal of the power-on driving signal generating circuit;

the reverse connection detection and execution circuit comprises a heavy and light current isolation optocoupler, a triggering current limiting resistor, a false triggering preventing resistor, two-way silicon controlled rectifier, an eighth filter capacitor, a ninth filter capacitor, a normally-closed contact, a normally-open contact, a seventh resistor, a normally-closed switch, and a reverse relay;

a first pin of a power terminal of the optocoupler is connected to the drain electrode of the FET, and a second pin of a power terminal of the optocoupler is grounded;

the triggering current limiting resistor is connected between a first output terminal of the optocoupler and an output terminal of the live line;

the false triggering preventing resistor is connected between a control electrode of the two-way silicon controlled rectifier and a first T2 electrode of the two-way silicon controlled rectifier;

the control electrode of the two-way silicon controlled rectifier is connected to a second output terminal of the optocoupler;

a second T2 electrode of the two-way silicon controlled rectifier is connected to the output terminal of the live line;

the eighth filter capacitor and the ninth filter capacitor are connected in series between the first T2 electrode of the two-way silicon controlled rectifier and the output terminal of the live line, in parallel with the normally-closed contact, and in parallel with the normally-open contact;

the eighth filter capacitor is connected to the first T2 electrode of the two-way silicon controlled rectifier;

the seventh resistor is connected between a point where the eighth filter capacitor is connected to the ninth filter capacitor, and an output terminal of the neutral line;

the normally-closed switch is provided on both the live line and neutral line, and located between the output terminal of the live line and the reset switch, and between the output terminal of the neutral line and the reset switch;

the normally-closed switch is linked with the second normally-open contact;

a first control terminal of the reverse relay is connected to the first T2 electrode of the two-way silicon controlled rectifier and a second control terminal of the reverse relay is connected to the output terminal of the neutral line; and the reverse relay drives the normally-closed switch through a second mechanical link.

4. The reverse grounding protection circuit of claim 1, wherein:

the power supply circuit comprises a piezoresistor and a over-current protection resistor;

the piezoresistor is connected between live line at the input port and the neutral line at the input port; and the over-current protection resistor is connected between the live line at the input port and the input terminal of the filter circuit of the power supply circuit.

5. The reverse grounding protection circuit of claim 2, wherein:

the power supply circuit comprises a piezoresistor and a over-current protection resistor;

the piezoresistor is connected between live line at the input port and the neutral line at the input port; and the over-current protection resistor is connected between the live line at the input port and the input terminal of the filter circuit of the power supply circuit.

6. The reverse grounding protection circuit of claim 3, wherein:

the power supply circuit comprises a piezoresistor and a over-current protection resistor;

the piezoresistor is connected between live line at the input port and the neutral line at the input port; and the over-current protection resistor is connected between the live line at the input port and the input terminal of the filter circuit of the power supply circuit.

7. A ground fault circuit interrupter, comprising an interrupter body, wherein the interrupter body includes the reverse grounding protection circuit of claim 1.

8. A ground fault circuit interrupter, comprising an interrupter body, wherein the interrupter body includes the reverse grounding protection circuit of claim 2.

9. A ground fault circuit interrupter, comprising an interrupter body, wherein the interrupter body includes the reverse grounding protection circuit of claim 3.

10. A ground fault circuit interrupter, comprising an interrupter body, wherein the interrupter body includes the reverse grounding protection circuit of claim 5.

11. A ground fault circuit interrupter, comprising an interrupter body, wherein the interrupter body includes the reverse grounding protection circuit of claim 4.

12. A ground fault circuit interrupter, comprising an interrupter body, wherein the interrupter body includes the reverse grounding protection circuit of claim 6.

* * * * *